(12) United States Patent
Baez (10) Patent No.: US 11,491,407 B2
(45) Date of Patent: Nov. 8, 2022

(54) WEARABLE DEVICE FOR STORING AND USING A PORTABLE GAMING SYSTEM

(71) Applicant: Brian Baez, Orlando, FL (US)

(72) Inventor: Brian Baez, Orlando, FL (US)

( * ) Notice: Subject to any disclaimer, the term of this patent is extended or adjusted under 35 U.S.C. 154(b) by 0 days.

(21) Appl. No.: 17/191,388

(22) Filed: Mar. 3, 2021

(65) Prior Publication Data

US 2022/0280877 A1 Sep. 8, 2022

(51) Int. Cl.
*A63F 13/98* (2014.01)
*G06F 1/16* (2006.01)
*A45C 11/00* (2006.01)

(52) U.S. Cl.
CPC .............. *A63F 13/98* (2014.09); *G06F 1/163* (2013.01); *A45C 2011/003* (2013.01)

(58) Field of Classification Search
None
See application file for complete search history.

(56) References Cited

U.S. PATENT DOCUMENTS

| | | | | |
|---|---|---|---|---|
| 5,294,031 A * | 3/1994 | Volpei | ...................... | A45F 3/00 224/192 |
| 5,649,658 A * | 7/1997 | Hoffman | ................... | A45F 3/04 190/2 |
| 6,296,094 B1 * | 10/2001 | Knecht | ................ | A45C 7/0095 190/107 |
| 6,354,477 B1 * | 3/2002 | Trummer | .................. | A45C 3/02 224/153 |
| 6,715,594 B2 * | 4/2004 | Milionta | ................ | A01K 97/06 150/111 |
| D650,989 S * | 12/2011 | Littleton | ........................ | D3/299 |
| 8,567,578 B2 * | 10/2013 | Cuong | ...................... | A45F 5/00 190/107 |
| 2001/0040109 A1 * | 11/2001 | Yaski | ........................ | A45F 5/00 206/320 |
| 2002/0134809 A1 * | 9/2002 | Angus | ........................ | A45F 3/00 224/662 |
| 2003/0102235 A1 * | 6/2003 | Swaim | .................. | A47B 23/002 206/320 |
| 2007/0045365 A1 * | 3/2007 | Guo | ..................... | B60R 11/0252 224/275 |
| 2009/0114690 A1 * | 5/2009 | Landay | .................. | A45C 13/30 224/575 |
| 2009/0288925 A1 * | 11/2009 | Hess | ..................... | A45C 13/02 190/107 |

(Continued)

*Primary Examiner* — Tramar Harper
(74) *Attorney, Agent, or Firm* — Jason T. Daniel, Esq.; Daniel Law Offices, P.A.

(57) ABSTRACT

A device for storing a portable electronic system includes a main body having four body sections that are separated by fold lines that are positioned along a common edge. The first body section includes a pair of wing-shaped pockets extending outward therefrom and a user belt for securing the main body horizontally around a user. The second body section includes a storage strap for receiving and engaging a portable electronic system. When the main body is in the closed position, the third and fourth body sections are folded over the portable system, and the first and second body sections are secured together. The fourth body section includes a pair of retention straps for also receiving the portable electronic system and positioning the system at a playing position when the device is in the open position.

6 Claims, 6 Drawing Sheets

(56) References Cited

U.S. PATENT DOCUMENTS

| | | | | |
|---|---|---|---|---|
| 2013/0277239 A1* | 10/2013 | Hutchinson | ............ | A45C 11/00 |
| | | | | 206/45.23 |
| 2014/0146455 A1* | 5/2014 | Abdelsamie | .......... | G06F 1/1632 |
| | | | | 361/679.02 |
| 2017/0013807 A1* | 1/2017 | Johnson | ................. | A01K 23/00 |
| 2017/0251790 A1* | 9/2017 | Bedasee | ............. | A45C 13/1069 |
| 2019/0374009 A1* | 12/2019 | Arikawa | ................. | A61F 13/84 |

* cited by examiner

WEARABLE DEVICE FOR STORING AND USING A PORTABLE GAMING SYSTEM

TECHNICAL FIELD

The present invention relates generally to accessories for portable gaming systems, and more particularly to a wearable device for storing and actively using of the same.

BACKGROUND

The statements in this section merely provide background information related to the present disclosure and may not constitute prior art.

Handheld electronic video game systems typically include an integrated video display, sound system, and controls in order to provide users with a complete gaming console in the palm of their hands. Owing to their small size and ease of use, such systems are an extremely popular mode of entertainment for children, teens and adults.

Indeed, many parents purchase such gaming systems to occupy small children while driving in the family vehicle. Although extremely useful and popular for this purpose, one common complaint is that children have a tendency to drop the console onto the floor. When this happens, the child or parent must then attempt to retrieve the system, which can be a distraction to the driver and is unsafe to do while the vehicle is in motion.

Another common complaint about these systems is that because they are designed to be used virtually anywhere, it is not uncommon for users (particularly children) to lose their console while traveling or visiting locations outside of the home. Although early versions of these systems were relatively inexpensive due to their pure standalone functionality, newer systems are designed to be multi-player compatible and offer a range of connectivity options not previously available. As such, modern portable gaming systems like the Nintendo Switch®, for example, can cost hundreds of dollars to purchase, not including the additional costs associated with games and accessories.

Although there are known types of carrying cases for portable gaming systems, these devices are primarily designed to protect the system during storage, and do not provide a user with functionality for playing the system while it is in the case.

Accordingly, it would be beneficial to provide a wearable device for a portable gaming console that can be used to both store the system and to actively play the system so as to overcome the drawbacks described above.

SUMMARY OF THE INVENTION

The present invention is directed to a device for storing a portable electronic system. One embodiment of the present invention can include an elongated main body member having a top end, a bottom end, and a plurality of body sections. Each of the body sections can be separated by fold lines that are positioned along a common edge, so as to permit each body section to independently bend and fold. The first body section located along the top end of the main body can include a pair of wing-shaped pockets extending outward therefrom and can further include a pair of belt sections. The belt sections forming a user belt for securing the main body horizontally around a user.

In one embodiment, the main body can include four distinct sections whereby the second section includes a storage strap for receiving and engaging a portable electronic system. When the main body is in the closed position, the third and fourth body sections can be folded over the portable system, and the first and second body sections can be secured together.

In one embodiment, the fourth body section can include a pair of retention straps for also receiving and engaging the portable electronic system. When the main body is in the fully open position, each of the body sections can move and bend to permit a user to hold and engage the portable electronic system secured onto the fourth body section at a playing position.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "portable gaming system" and derivatives thereof refers to any type of portable electronic system having a main body, user controls, and/or a display. Several nonlimiting examples of portable gaming systems include, but are not limited to: the Switch®, Switch Lite®, DS®, 2DS®, 3DS®, and Gameboy®, for example, each being commercially available by Nintendo®. Of course, any number of other types of gaming systems, video systems and/or different types of electronic devices are also contemplated As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "removably secured," and derivatives thereof shall be used to describe a situation wherein two or more objects are joined together in a non-permanent manner so as to allow the same objects to be repeatedly joined and separated.

As described herein, the term "connector" includes any number of different elements that work alone or together to repeatedly join two items together in a nonpermanent manner. Several nonlimiting examples include opposing strips of hook and loop material (i.e. Velcro®), attractively-oriented magnetic elements, flexible strips of interlocking projections with a slider (i.e., zipper), tethers, buckles such as side release buckles, and compression fittings such as T-handle rubber draw latches, hooks, snaps and buttons, for example. Each illustrated connector can be permanently secured to the illustrated portion of the device via a permanent sealer such as glue, adhesive tape, or stitching, for example.

FIGS. 1-6 illustrate one embodiment of a wearable device for storing and using a portable gaming system 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

Figure 1:
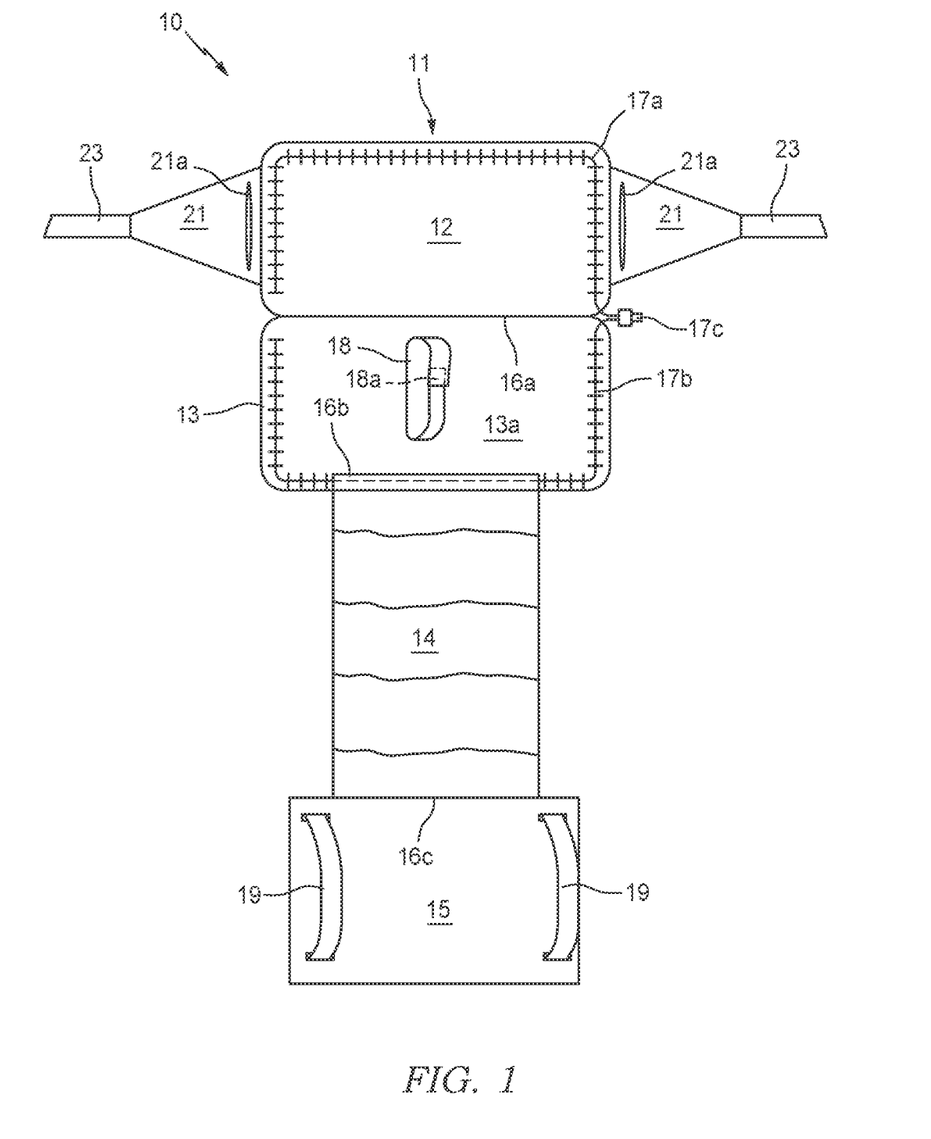
FIG. 1 is a top view of a wearable device for storing and using a portable gaming system, in accordance with one embodiment of the invention.
Figure 2:
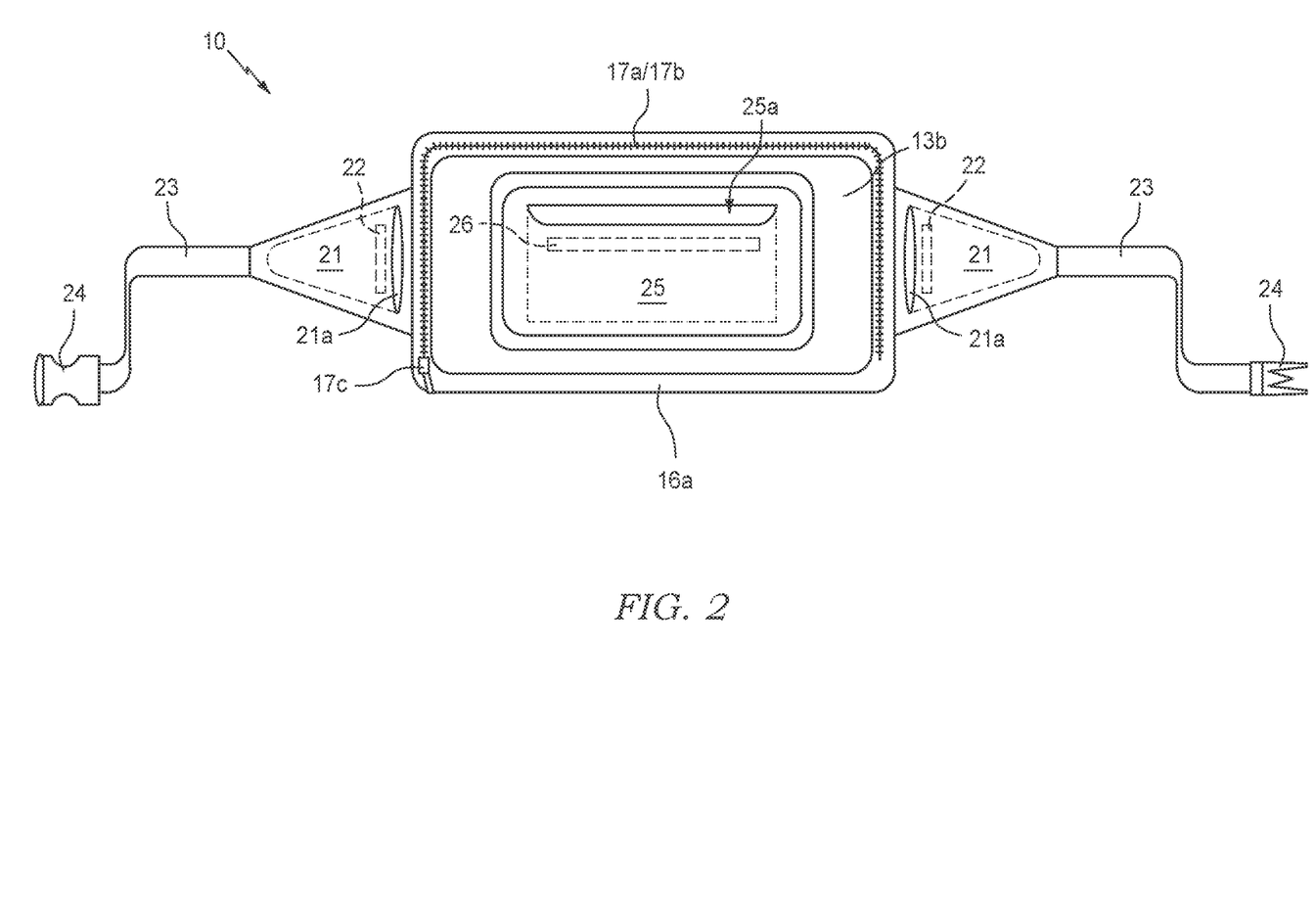
FIG. 2 is a front view of a wearable device for storing and using a portable gaming system in the closed position, in accordance with one embodiment of the invention.

As shown best at FIGS. 1 and 2, one embodiment of the device 10 can include, essentially, an elongated main body member 11 having a pair of wing-shaped outer pockets 21 and a pair of belt sections 23.

In one embodiment, the main body 11 can include a first body section 12, a second body section 13, a third body section 14 and a fourth body section 15. Each distinct section 12-15 can be separated by fold lines 16a, 16b and 16c, along a common edge so as to allow the entire body to bend and fold in the manner hereinafter described. Such a feature permitting the device 10 to transition between the fully open position shown at FIG. 1, the partially open position shown at FIG. 3, and the closed position shown at FIG. 2.

In the preferred embodiment, the main body 11 and each body sections 12-15 can be constructed from a single piece of malleable and water-resistant material having high durability and tensile strength. Several nonlimiting examples include, but are not limited to various types of nylon fabric, vinyl fabric, Teflon coated fabric, leather and/or synthetic leather, among others, for example.

Although described above with regard to a unitary construction and material, other embodiments are contemplated wherein each of the body sections can be constructed as separate elements from any number of different materials that are joined along the common edges in accordance with known manufacturing processes such as sewing stitches, seam tape and the like.

Figure 3:
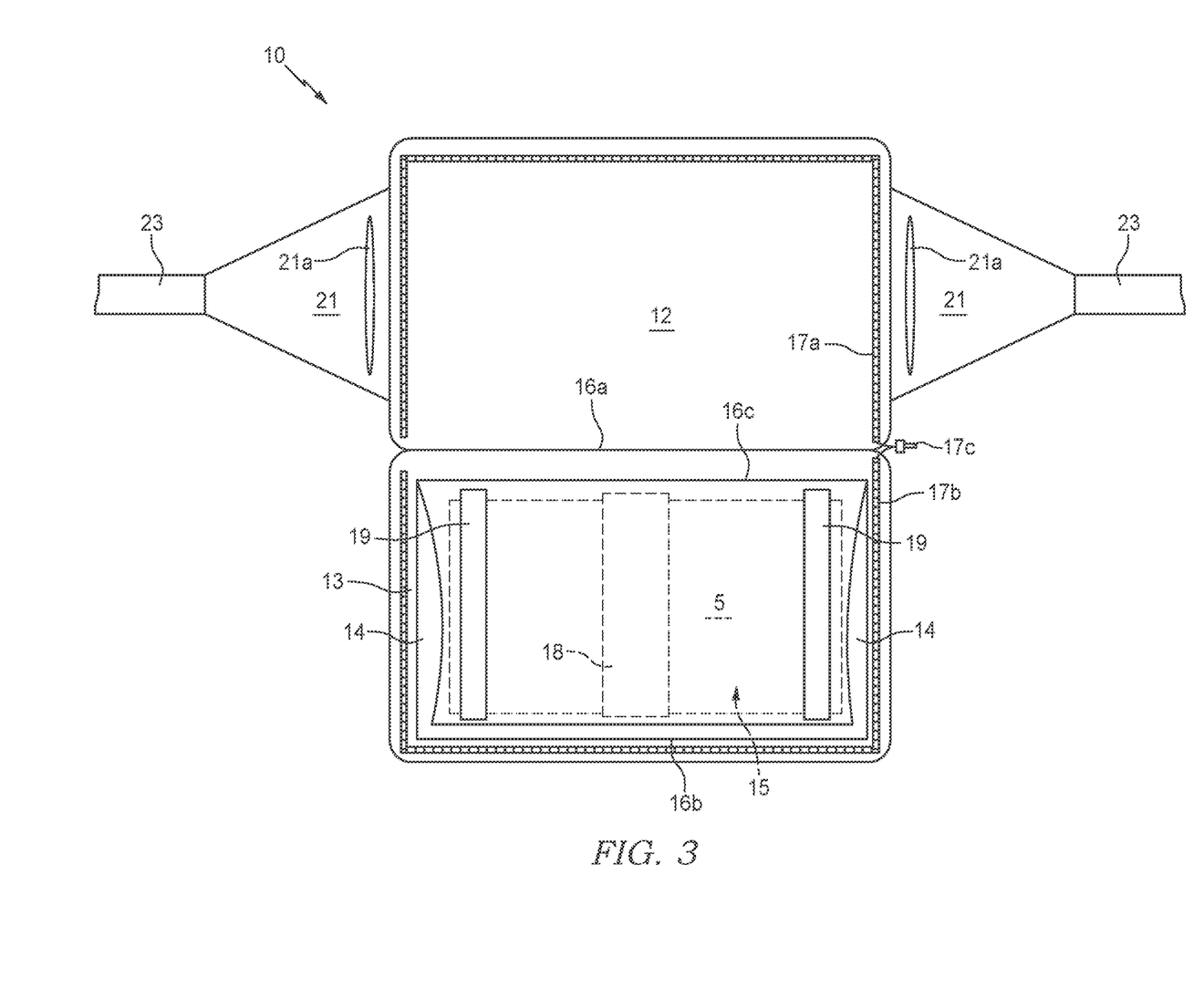
FIG. 3 is a front view of a wearable device for storing and using a portable gaming system in operation, in accordance with one embodiment of the invention.
Figure 4:
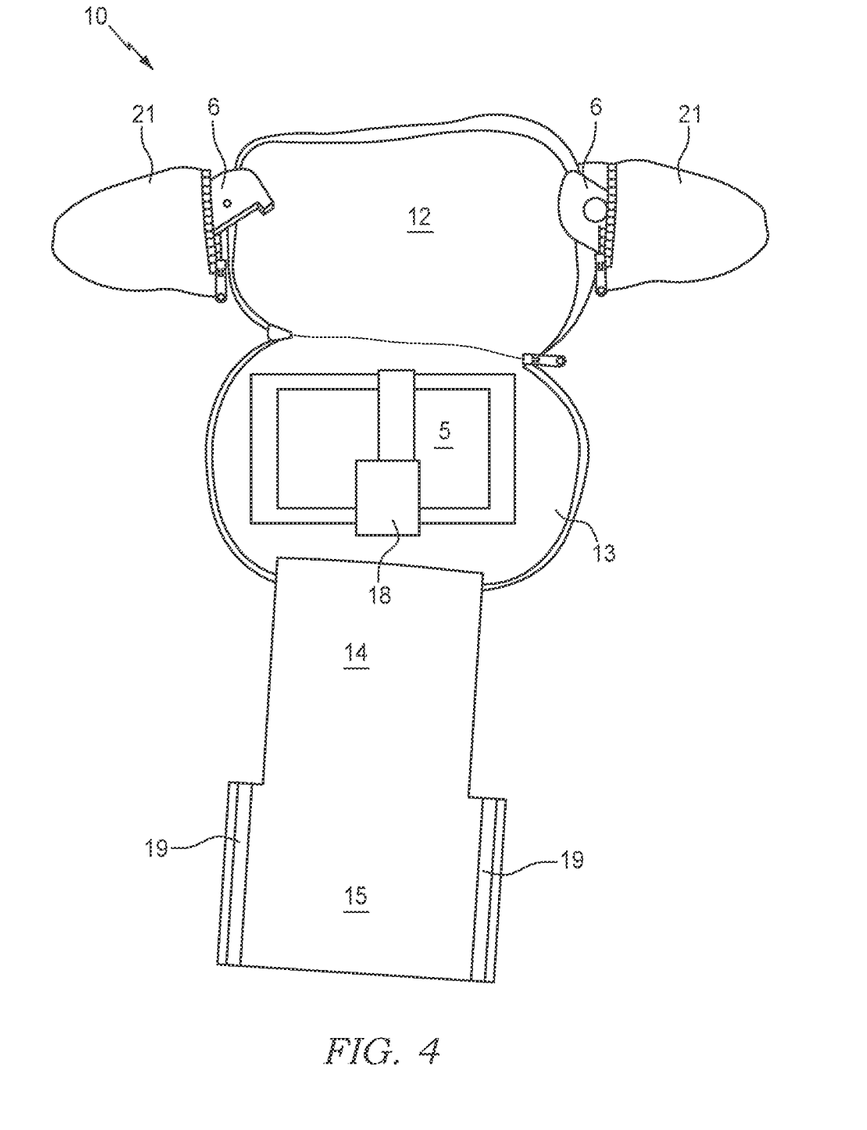
FIG. 4 is another front view of a wearable device for storing and using a portable gaming system in operation, in accordance with one embodiment of the invention.
Figure 5:
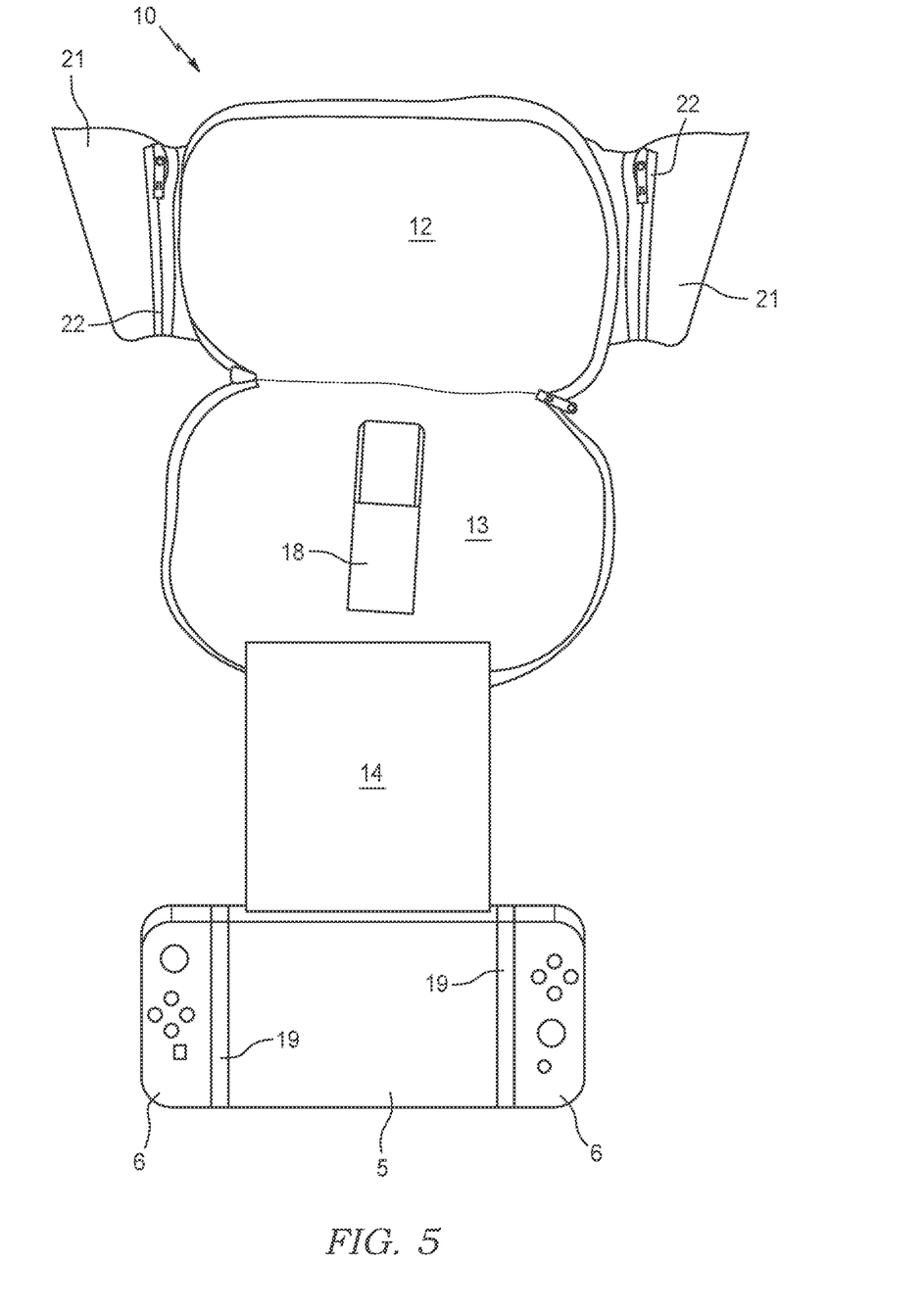
FIG. 5 is yet another front view of a wearable device for storing and using a portable gaming system in operation, in accordance with one embodiment of the invention.

In one embodiment, body sections 12 and 13 can include generally identical shaped members each having a flexible strip of interlocking projections 17a and 17b along an outer edge. A slider 17c can be in communication with the projections to form a zipper (referred to collectively at 17) that can selectively close the sections together when the remaining body sections 14 and 15 are folded as shown at FIG. 3. Of course, any number of other types of connectors can be utilized to removably position the body sections between the open and closed positions.

In one embodiment, one or more storage straps 18 can be positioned along the inside facing surface 13a of the body section 13, and/or the body section 12. In the preferred embodiment, the storage strap can comprise a single nylon strap having hook and loop connectors 18a along both ends. As will be described below, the storage strap can function to selectively receive and secure a portable electronic system between the body sections 12 and 13 for storage, when the device 10 is in the closed position.

In one embodiment, a pair of retention straps 19 can be positioned along either side of the body section 15. In the preferred embodiment, each of the retention straps 19 can comprise elastic bands that can stretch to accommodate any number of different sized and shaped portable electronic systems. As will be described below, the retention straps 19 can be positioned so as to selectively receive and secure a portable electronic system onto the body section 15 in a manner that does not block the system screen or controls, in order to permit a user to actively play/operate the system when secured onto the section 15.

Although described above as including particular types of straps and/or connection mechanisms, this is for illustrative purposes only. To this end, each of the body sections can include any number of different devices and/or different types of connectors in order to permit the use and operation of the device 10 in the manner described herein.

As shown best at FIG. 2, a pair of wing-shaped pockets 21 can be positioned horizontally outward from each side of the main body section 12. Each of the pockets can include a pocket opening 21a for permitting access to the interior space. The opening can be selectively sealed by a pocket connector 22 such as strips of hook and loop material, magnetic elements, zippers or other such devices.

As will be described below, the wing shaped pockets can function to receive and store any type of accessories such as hand controllers for use with a portable electronic system secured onto the main body, for example.

In one embodiment, a pair of elongated belts 23 can extend outward from each of the pockets 21. In one embodiment, each of the belts 23 can include a connector 24 along a distal end such as the illustrated side release buckle and receiver, for example. The belt and connectors can function in the expected manner to secure the device 10 about the waist of a user so as to reduce or eliminate movement of the device. Of course, any number of other types of connectors are also contemplated.

In one embodiment, a central pocket 25 can be positioned along the outside surface of the body section 13b. The central pocket can also include an opening 25a having a connector 26 such as strips of hook and loop material, magnetic elements, zippers or other such devices. The central pocket can function to receive and store any number of items as is desirable by a user.

FIGS. 3-6 illustrate one embodiment of the device 10 in operation. As shown, a user can initially open the device 10 via the zipper 17 in order to separate the body sections 12 and 13. When so positioned, a portable electronic system 5 that is stored on the body section 13 by the storage strap 18 will be covered by the still-folded body sections 14 and 15.

In this regard, it is noted that most impacts with or from foreign objects would occur along the front of the device 10. As such, in the closed position, a portable system 5 stored by the storage strap 18 on the body section 12 would have three distinct layers of protection, e.g., body sections 13, 15 and 14 along the front surface, to provide impact resistance and to reduce the likelihood of breaking. Additionally, some embodiments are contemplated wherein one or more of the body sections 13-15 include a layer of impact resistant material such as foam, rubber or padding, for example, so as to further reduce the possibility of damage to a system 5 stored by the device 10.

In either instance, when the user wants to access the system 5, such as to play a game, for example, the user can extend body sections 14 and 15 to reveal the system 5, and can remove any accessories from the wing pockets, such as the illustrated controllers 6, for example.

Finally, a user can secure the system 5 onto the retention straps 19 and can actively play the system while wearing the device 10. Such a feature advantageously allows the device to function as a leash in order to prevent the user from accidentally dropping the system 5 onto the ground, and/or losing the system.

As described herein, the device 10 can be sized so as to be used with a plurality of different electronic systems, or can be sized such that one or more of the body sections include complementary dimensions to a particular gaming system. To this end, some embodiments of the device can be sized such that body sections 12, 13 and 15 include a width and a height that are complementary to the Nintendo Switch®, for example. In this manner, the retention straps and body sections will include dimensions suitable for engaging such a system as shown in the drawings.

Figure 6:
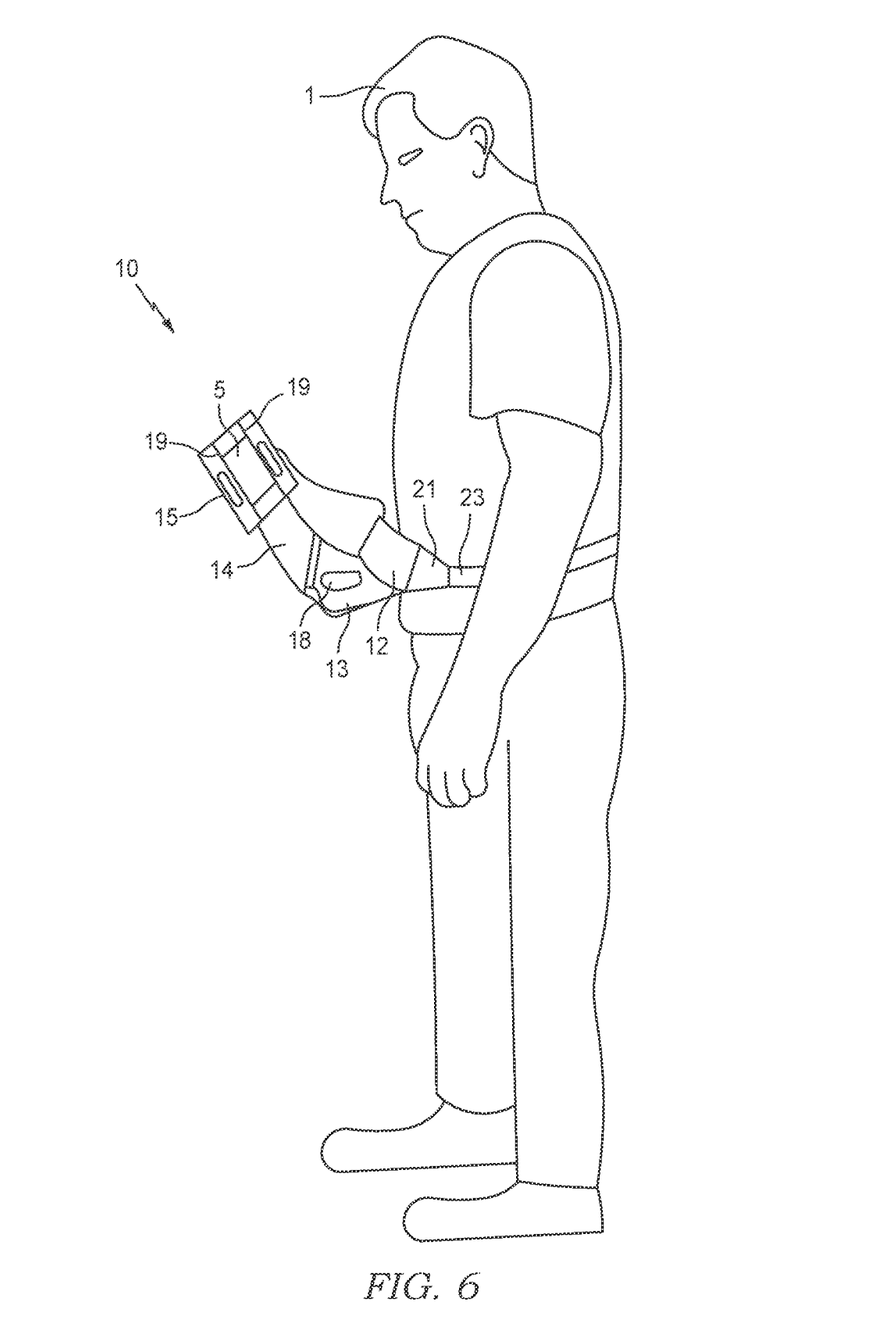
FIG. 6 is a perspective view of a wearable device for storing and using a portable gaming system in operation, in accordance with one embodiment of the invention.

In either instance, each device 10 is designed so as to allow a user to easily move the system 5 into any number of playing positions when wearing the belt and when a system is secured to the device as shown at FIG. 6. To this end, when in the fully open position, each of the body sections can independently move and bend to permit a user to hold and engage the portable electronic system secured onto the fourth body section at a desirable playing position.

As described herein, a "playing position" is described as being able to position the portable electronic system between a location that is horizontal to the face of the user wearing the device and extending downward to the knees of the user. As such, a user wearing the device 10 is advantageously able to hold the system at any number of positions while standing or sitting, which they would traditionally hold such a system if it were not connected to the device 10.

Although dimensions are not critical, one preferred embodiment of the device 10 is contemplated wherein each of the body sections includes a width (e.g., distance between wing-pockets 21) of approximately 8.5 to 10 inches, and each of the body sections includes a height (e.g., distance between each common edge) of approximately 4.5 to 6 inches each. Such dimensions being suitable for ensuring a user can position body section 15 and a portable electronic system 5 within the playing position for an average sized adult. Of course, any number of other dimensions are also contemplated.

Although not specifically illustrated, some embodiments are contemplated wherein one or more of the body sections 12-15 and/or fold lines 16a-16c are afforded rigid or semi-rigid members to permit a user to position and hold the device in a particular configuration other than the open and closed positions shown.

Additionally, any number of other pockets, pocket sections and/or holding components may be provided at or along any portion of the device in order to engage and receive secondary components such as game cartridges, for example.

As described herein, one or more elements of the wearable device for storing and using a portable gaming system 10 can be secured together utilizing any number of known attachment means such as, for example, glue, seem tape, stitching, and the like, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A device for storing a portable electronic system, said device comprising:
a main body member having a plurality of body sections that include a first body section, a second body section having a top end that is connected to a bottom end of the first body section, a first connector that is disposed along each of the first body section and the second body section, said first connector functioning to selectively secure the first body section and the second body section together, a third section having a top end that is connected to a bottom end of the second body section, and a fourth body section having a top end that is connected to a bottom end of the third body section;

a plurality of fold lines that are positioned along a common edge of each of the plurality of body sections;

a pair of belt sections that extend outward perpendicularly from the main body member, said pair of belt sections including functionality for securing the main body member onto a user;

a storage strap that is positioned along an inside surface of the second body section, said storage strap including functionality for receiving and engaging a portable electronic system, wherein the main body member is configured to transition between a fully open position, a partially open position; and a closed position, wherein the third body section and the fourth body section are configured to fold onto the inside surface of the second body member when the device is in the closed position, wherein in the closed position, the portable electronic system is fully enclosed by the main body member.

2. The device of claim 1, further comprising:
a pair of wing shaped members that extend outward from opposite sides of the first body section.

3. The device of claim 2, wherein each of the pair of wing shaped members include pockets having a pocket opening and a pocket connector.

4. The device of claim 3, wherein the pair of belt sections are connected to the pair of wing shaped members.

5. The device of claim 1, further comprising:
a pair of retention straps that are disposed along the fourth body section.

6. The device of claim 5, wherein the pair of retention straps are positioned so as to engage the portable electronic system when the device is in the fully open position.

* * * * *